(12) United States Patent
Katz

(10) Patent No.: US 11,860,106 B1
(45) Date of Patent: Jan. 2, 2024

(54) SYSTEM AND METHOD FOR HIGH GAIN RAMAN SPECTROSCOPY

(71) Applicant: Sanguis Corporation, Selden, NY (US)

(72) Inventor: Jeffrey Owen Katz, Selden, NY (US)

(73) Assignee: SANGUIS CORPORATION, Selden, NY (US)

( * ) Notice: Subject to any disclaimer, the term of this patent is extended or adjusted under 35 U.S.C. 154(b) by 0 days.

(21) Appl. No.: 18/302,954

(22) Filed: Apr. 19, 2023

(51) Int. Cl.
| | |
|---|---|
| *G01J 3/44* | (2006.01) |
| *G01N 21/65* | (2006.01) |
| *G01J 3/10* | (2006.01) |
| *G01J 3/06* | (2006.01) |

(52) U.S. Cl.
CPC ............... *G01N 21/65* (2013.01); *G01J 3/06* (2013.01); *G01J 3/10* (2013.01); *G01J 3/44* (2013.01); *G01J 2003/064* (2013.01); *G01J 2003/102* (2013.01); *G01J 2003/4424* (2013.01); *G01N 2021/655* (2013.01); *G01N 2201/0691* (2013.01)

(58) Field of Classification Search
CPC .. G01N 21/65; G01N 21/64; G01N 2021/655; G01N 2201/0691; G01J 3/06; G01J 3/10; G01J 3/44; G01J 2003/064; G01J 2003/102; G01J 2003/4424; A61B 5/00; A61B 5/0075
See application file for complete search history.

(56) References Cited

U.S. PATENT DOCUMENTS

2016/0363537 A1* 12/2016 Krishnamachari ... G01J 3/0227
2017/0010456 A1*  1/2017 Gopinath ............. G02B 23/243
2017/0127947 A1*  5/2017 Alfano .................. G01N 21/65
2018/0188019 A1*  7/2018 Eggleston .......... G01B 9/02004
2018/0328786 A1   11/2018 Lambert

OTHER PUBLICATIONS

Meng, Zhaokai et al. "Continuous-Wave Stimulated Raman Scattering (cwSRS) Microscopy." Applied physics. B, Lasers and optics vol. 112,1 (2013): 99-103. doi:10.1007/s00340-013-5405-6, which is an equivalent to 1) Laser Physics Letters 10(2013) 06570 (7Pp) cited in the present specification.

Bullen, Peter et al. "Stimulated Raman with Broadband LED Stokes Source for Analysis of Glucose and Hemoglobin." Adaptive Optics: Analysis, Methods & Systems. Optica Publishing Group, 2018.

* cited by examiner

*Primary Examiner* — Abdullahi Nur
(74) *Attorney, Agent, or Firm* — Leason Ellis LLP

(57) ABSTRACT

A system for high gain stimulated Raman spectroscopy comprises a first continuous wave laser having an output beam at a tunable optical frequency modulated at a first RF frequency, a second continuous wave laser having a second output beam at an optical frequency modulated at a second RF frequency, wherein the modulation frequencies are selected such that their beat notes represent a Raman resonance frequency, a dual-beam rasterizing probe including first and second photosensors and a rasterizer configured to scan the first and second laser output beams onto a sample, exposing the sample to a reduced average power of laser radiation stimulating the sample to emit Raman radiation signals. The Raman signals are directed to the photosensors and the outputs of the photosensors are supplied to a differential amplifier configured to provide sensitivity and gain to signals at the beat note resonant frequency and to filter signals at other frequencies.

21 Claims, 3 Drawing Sheets

SYSTEM AND METHOD FOR HIGH GAIN RAMAN SPECTROSCOPY

FIELD OF THE DISCLOSURE

The present disclosure relates to spectroscopy, and more particularly to a system and method for performing stimulated Raman spectroscopy (SRS) using radio frequency (RF) modulated continuous wave (CW) lasers, a dual-beam rasterizing probe, and photodiode sensor module. The method and system provide a high gain Raman spectrum that is virtually devoid of interference from sample fluorescence, has a higher resolution, and demonstrates a high sensitivity and signal-to-noise ratio.

BACKGROUND OF THE DISCLOSURE

Current stimulated Raman spectroscopy (SRS) instrumentation and research is dominated by the use of large and expensive picosecond or femtosecond pulsed lasers. These are typically used in the context of Raman microscopy. Ultrafast lasers are used because, with short pulses and low duty cycles, enormous peak powers may be achieved while keeping the average output power quite low (e.g., 10 milliwatts). The high peak laser powers yield extremely high SRS gains as the gain scales roughly with the product of the laser powers: a doubling of the power of each laser results in a quadrupling of the stimulated Raman signal. An exponential term also comes into play yielding even greater gains when laser powers are sufficient. Since sample fluorescence and Raleigh scattering scale only linearly with laser power, such nonlinear interactions allow for extremely strong stimulated Raman signals on a background of relatively low sample fluorescence and Raleigh scattered light when high peak laser powers are employed.

There have been very few investigations related to the use of continuous (CW) lasers for SRS as opposed to ultrafast pulsed lasers. The reason is that, as noted above, the higher peak laser power of pulsed lasers results in greater SRS gain, even when average laser power (and fluorescence) remains constant. CW lasers provide far lower SRS gain due to their lower peak power. With an effective duty cycle of 100%, the peak power of a CW laser is equal to its average power; with a repeatedly pulsed femtosecond laser that has a duty cycle of 0.01%, for example, the peak power will be 10000 times greater than the average power. This does not mean that SRS gain does not occur with CW lasers: it does, only to a lesser extent as a result of the lower peak powers involved. However, a degree of SRS has been demonstrated in investigations that employ relatively inexpensive CW lasers.

In one investigation, published in *Laser Physics Letters* 10(2013) 06570 (7Pp), a 532 nm pump or excitation laser producing 150 mw output measured at the sample was employed with a 632.8 nm stokes or Probe laser running at 15 mw. The pump laser was mechanically chopped at around 4000 Hz. A 0.4 NA microscope objective provided a focal spot of around 2 um diameter. This provided high spatial resolution (for microscopy) as well as very high power density (their estimate was around 107 watts/$cm^2$) enabling high levels of SRS gain to be achieved. A standard amplified photodiode having a transconductance amplifier was used as the sensor. Signals from the amplified sensor, along with a reference signal from the mechanical chopper, were sent to a standard lock-in amplifier for signal detection. Overall, the experiment demonstrated the nonlinear SRS effect, in which the SRS signal was separately proportional to each laser's power, and reasonably good images were obtained.

Another investigation that concerned non-imaging spectrometry, was conducted at Columbia University in New York and reported in arXiv:1809.05090 (physics) (submitted 12 Sep. 2018). One mechanically chopped CW laser was used as the pump or excitation source. A fiber-coupled LED array was used as a broadband stokes or Probe source. The experiment employed a monochromator feeding directly into a photomultiplier tube (PMT) that was followed by a lock-in amplifier or photon counter as the detector for the CW-SRS signal. Glucose solutions served as the samples. A signal to noise ratio about an order of a magnitude greater than that achieved with spontaneous Raman was observed. In addition, the peaks visible in spectrograms based on the stimulated Raman data were clearly sharper, implying enhanced resolution. Partial least squares models fitted to the 642-1139 $cm^{-1}$ range yielded standard errors of 0.0173 mM for spontaneous Raman, versus 0.00104 mM for stimulated Raman. SRS gain was less than observed in the microscopy context as a result of a less tightly focused beam (less peak power in a spatial, rather than pulsed laser, sense) as well as other factors.

While the investigations disclosed thus far indicate some progress in the use of CW lasers for SRS, the relatively low SRS gain levels and the relatively high amount of signal noise demonstrated thus far indicates that a great deal of improvement is needed before a dual CW laser system for SRS can be used to accurately measure weakly scattering analytes in a broad range of applications. What is therefore needed is a system and method for SRS that provides considerably higher gain and less noise than those systems and methods employed thus far.

SUMMARY OF THE DISCLOSURE

According to a first aspect, the present disclosure provides a system for high gain stimulated Raman spectroscopy. The system comprises: i) a first continuous wave laser having a first output beam at a tunable optical frequency which is modulated at a first RF modulation frequency ($f_1$) and a first average power of laser radiation; ii) a second continuous wave laser having a second output beam at an optical frequency which is modulated at a second RF modulation frequency ($f_2$) and a second average power of laser radiation, wherein the first and second RF modulation frequencies ($f_1$, $f_2$) are selected such that their difference or sum beat notes ($f_1-f_2$; $f_1+f_2$) represent a Raman resonance frequency; iii) a dual-beam rasterizing probe (R-probe) including first and second photosensors and coupled to the first and second continuous wave laser output beams, the R-probe including a rasterizer that is configured to scan the first and second continuous wave laser output beams onto a sample over an exposure area, wherein the scanned sample exposure area is exposed to an average power of laser radiation that is reduced relative to first and second average powers of laser radiation and in response thereto is stimulated by the laser beams to emit Raman radiation signals, the R-probe further directing Raman signals emitted from the sample to the first and second photosensors, the first and second photosensors having respective first and second outputs responsive to the first and second continuous wave laser output beams and the Raman signals emitted from the sample; and iv) a differential amplifier coupled to outputs of the first and second photosensors of the R-probe that is configured to provide sensitivity and gain to signals at the beat note resonant frequency ($f_1-f_2$) and to filter out signals at other frequencies so as to output the Raman radiation signals with gain.

According to a second aspect, the present disclosure provides a method of obtaining high gain stimulated Raman spectroscopy. The method comprises: i) providing a first continuous wave laser having first output beam at a tunable optical frequency which is modulated at a first RF modulation frequency ($f_1$) and a first average power of laser radiation; ii) providing a second continuous wave laser having a second output beam at an optical frequency which is modulated at a second RF modulation frequency ($f_2$) and a second average power of laser radiation, wherein the first and second RF modulation frequencies ($f_1$, $f_2$) are selected such that their difference or sum beat notes ($f_1-f_2$; $f_1+f_2$) represent a Raman resonance frequency; iii) rasterizing the first and second output beams continuous wave lasers by scanning the first and second output beams onto a sample over an exposure area, wherein the scanned sample exposure area is exposed to an average power of laser radiation that is reduced relative to first and second average powers of laser radiation and in response thereto is stimulated by the laser beams to emit Raman radiation signals; receiving the Raman signals at first and second photosensors; and delivering output of the first and second photosensors to a differential amplifier that is configured to provide sensitivity and gain to signals at the beat note resonant frequency ($f_1-f_2$) and to filter out signals at other frequencies so as to output the Raman radiation signals with gain.

These and other aspects, features, and advantages can be appreciated from the following description of certain embodiments of the invention and the accompanying drawing figures and claims.

DESCRIPTION OF CERTAIN EMBODIMENTS OF THE DISCLOSURE

The systems and methods described herein differ from the above-described attempts at SRS with CW lasers, in that they recover much of the gain that would normally be lost with CW lasers when performing SRS spectroscopy. Embodiments disclosed herein employ two CW lasers, at least one of which is optically tunable, that are each modulated with custom radio frequency (RF) patterns and run at higher powers than are usually encountered in spontaneous Raman spectrometry.

Embodiments of the system include a high-throughput dual-beam confocal rasterizing probe and a tuned differential photodiode sensor system having a large capture area and solid angle, along with specialized detection hardware and algorithms. The disclosed systems and methods make feasible the acquisition of Raman spectra with high signal-to-noise ratios and resolutions. Robust measurements are obtained when working with inhomogeneous samples, and the high risk of tissue damage that would normally result from the extreme peak pulse powers associated with picosecond and femtosecond systems is ameliorated. Signal-to-noise ratio is vastly improved by eliminating interference from fluorescence (except for shot noise), and the impact of sample heating and photobleaching. SRS gains far greater than that which would normally be achievable with CW lasers running at low power are achieved, bringing the effective SRS sensitivity to a level approaching that achieved with ultrafast lasers. The systems and methods described herein may be implemented with inexpensive CW lasers and ancillary instrumentation.

Figure 1:
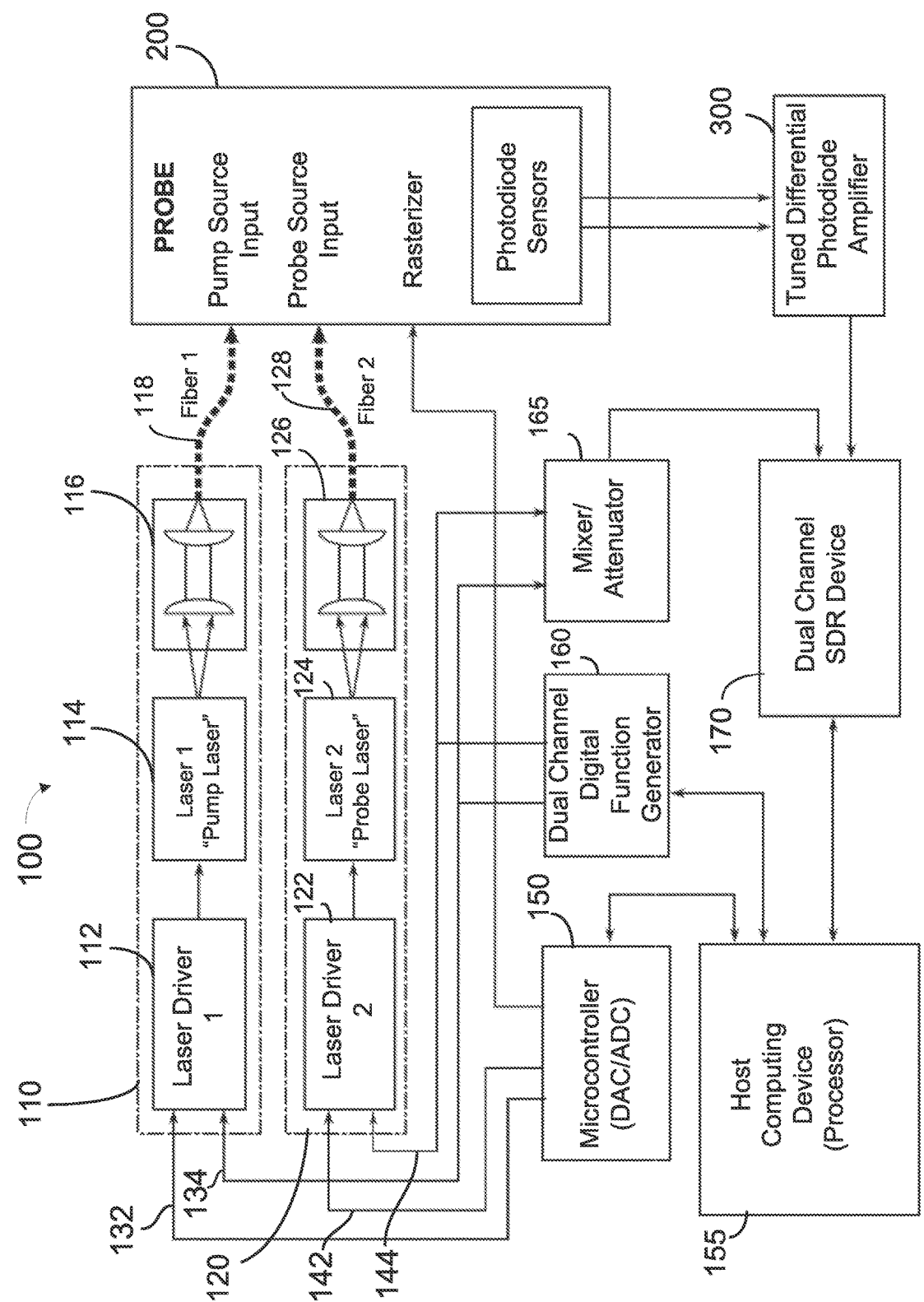
FIG. 1 is a schematic diagram of a system for high gain SRS Raman Spectroscopy according to an embodiment of the present disclosure.

FIG. 1 is a schematic diagram of a system 100 for high gain SRS Raman Spectroscopy according to an embodiment of the present disclosure. The system includes two custom RF-modulated CW lasers, a first laser apparatus 110 and a second laser apparatus 120. Laser device includes a first laser driver 112, a first laser device 114, referred to as the "Pump" or excitation laser, and a fiber coupler 116 that receives and transfers the pump laser 114 to a first optical fiber 118. The second laser apparatus 120 includes a second laser driver 122, a second laser device 124 referred to as the "Probe" or stokes laser, and a second laser coupler 126 that receives and transfers the probe laser to a second optical fiber 128. Each of laser devices 114, 124 can comprise a standard laser diode mounted on a cold plate that is attached to a thermoelectric cooling element (TEC). The TEC is, in turn, is clamped to a heat sink. This arrangement allows the temperature of both the Pump laser 114 and the Probe Laser 124 to be stabilized and precisely controlled. At least one of the Pump or Probe lasers 114, 124 are optically tunable in terms of frequency. Typically, the Pump laser 114 operates at a shorter optical wavelength than the Probe laser 124. Both lasers 114, 124 are continuous wave (CW), coherent light sources.

Laser drivers 112, 122 can be implemented using custom electronics that provide both low-frequency modulation (from DC to about 5 KHz) on one input, and high-frequency modulation (50 KHz to over 20 MHz) on the other input. Laser driver 112 has a low-frequency input 132, and a high-frequency input 134. Likewise, laser driver 122 has a low-frequency input 142 and a high-frequency input 144. In some embodiments, the low-frequency inputs 132, 142 are used for switching the laser on and off, for applying slow pulse modulation, and for controlling power. The high-frequency inputs 134, 144 are used for RF modulation. The low-frequency inputs 132, 142 to each laser driver 112, 122 can be generated by a single microcontroller 150 that receives commands from the host computer 155. The high-frequency inputs 134, 144 used for RF modulation are provided with the required signals by a dual-channel, crystal-controlled function generator 160 which is coupled to the host computer 155. The host computer 155 can configure the modulation frequencies and waveforms of the high-frequency inputs 134, 144 by sending commands to the function generator 160. The actual laser modulations may be examined with an oscilloscope connected to a small, properly terminated, reverse-biased photodiode. This measure can be useful to verify that the lasers are being modulated as required by the exemplary implementation of the systems and methods described herein.

The output of laser apparatus 110 is coupled via optical fiber 118 to a first input of a dual-beam rasterizing Probe device 200 ("R-Probe) which is discussed in greater detail below. The output of laser apparatus 120 is coupled via optical fiber 128 to a second input of the R-Probe 200. A third "rasterizing" input is further coupled to the R-Probe 200.

At least one of the laser devices 114, 124 (i.e., either or both) is optically tunable over a small range. In some embodiments tuning is accomplished by varying the temperatures of the laser diodes which can be accomplished by changing the setpoints of the TEC drivers which are coupled to and controlled by the host computer 155. Is well-known that the output wavelength of a typical laser diode is affected by temperature (approximately 0.3 nm/° C.), with higher temperatures resulting in longer wavelengths. However, there are many other ways to implement a tunable laser, many with a wider wavelength range and faster tuning than that provided by thermal methods.

In an exemplary implementation that was used to demonstrate the effectiveness of the systems and methods disclosed herein, the TEC-based (thermal) method was employed for tuning the Pump laser 114 over a range of wavelengths between 635.6 and 639.6 nm. This wavelength range was selected because lasers operating at such wavelengths are readily available and this wavelength range and returned Raman signals penetrate human skin. The Probe laser 124 was fixed at a wavelength of 685 nm. This wavelength, when used with a Pump laser 114 operating in the range between 635.6 and 639.6 nm, allows Raman peaks in the range from 1036 $cm^{-1}$ to 1134 $cm^{-1}$ to be detected. This range includes and enables detection of the large glucose signals at 1054 $cm^{-1}$ and at 1126 $cm^{-1}$. In other implementations, by tuning both the Pump and Probe lasers 114, 124 and applying suitable temperature settings, a Raman coverage much greater than twice this range can be achieved. With multiple switched lasers, all preferably, but not necessarily on a common TEC plate and coupled to a single multimode fiber, the full Raman fingerprint range and beyond can be captured.

As noted above, both the Pump and Probe lasers 114, 124 are RF modulated. In the exemplary implementation, the shorter wavelength Pump laser was modulated at f1 (4.8 MHz), while the longer wavelength Probe laser was modulated at f2 (5.9 MHz). Consequently, the beat notes generated by nonlinear interactions between the laser beams and the molecules in the sample will be found at the difference and sums of the two frequencies, i.e., 1.1 MHz (|f1−f2|) and 10.7 MHz (|f1+f2|). The modulation frequencies f1 and f2 were chosen so that they, as well as any beat notes, would fall above the 1/f noise "knee" of the lasers and sensors. This choice of frequencies dramatically reduces the impact of high levels of "1/f" or flicker noise that is exhibited by many lasers at frequencies up to about 1 MHz, as well as the lower levels of flicker noise occurring in the sensors, allowing performance approaching the shot noise limit to be achieved. In addition, well-chosen modulation frequencies reduce the influence of stray light sources, switching power supplies, Compact Fluorescent (CFL) lamps, and even local AM radio stations. The modulation frequencies can be easily adjusted to avoid any local interference sources. In addition, the effect of slow baseline drift is eliminated.

Beyond noise reduction, modulating the lasers at frequencies such as those selected in the exemplary implementation enables discrimination between the strong unwanted signals derived from Rayleigh scattering and sample fluorescence, on the one hand, and the relatively weak beat note resulting from stimulated Raman scattering, on the other. This is because the beat note occurs at a frequency far removed from the laser modulation frequencies. Given that the desired beat note appears, in the exemplary setup, at 1.1 MHz, with the strong unwanted signals at DC, and at 4.8 MHz and 5.9 MHz, a large blocking dynamic range can be achieved in the resonant sensor system.

To summarize, the use of RF modulated lasers provides several advantageous benefits. First, the two modulation frequencies (f1 and f2) result in a heterodyne or "beat note" (|f1−f2|) due to the non-linear interaction in the sample molecules when the optical frequency difference (|ω1−ω2|) between the lasers corresponds to a Raman-active band of those molecules. Hence a beat note is only generated by the non-linear SRS process when the lasers differ in optical frequency by amounts that correspond to Raman active molecular resonances. No beat notes are generated by fluorescence, Raleigh scattering, and other types of noise since these processes do not involve nonlinear interactions between the two modulated laser signals. Accordingly, the beat notes reflect primarily stimulated Raman signals, free of interference from sample fluorescence and other sources. The reduction of noise allows a clean Raman spectrum to be obtained by detecting and measuring the intensity of the beat note(s) (at |f1−f2| or at |f1+f2|) that reflect stimulated Raman scattering as the optical frequency difference (|ω1−ω2|) between the lasers is swept over the desired spectral range. Additionally, as noted, keeping the RF laser modulations and the RF beat note over 1 MHz dramatically lowers the impact of "1/f" noise as it moves all significant signals well above the 1/f noise "knee" of both the lasers and the sensors (described below), minimizing this important source of noise.

Preferred embodiments of the systems and methods herein employ Pump and Probe lasers 114, 124 that have moderately higher output powers than those usually found in the context of spontaneous Raman instruments. Normally, higher laser powers would result in excessive sample heating and photobleaching. However, this problem is solved by the R-Probe 200 which dramatically reduces the average power density at the sample. The use of moderately higher laser power adds to the SRS enhancement achieved by the system. Additional gain, in the sense of increased total SRS signal levels, results from the 100% duty cycle in which SRS scattered photons are continuously collected. By way of contrast, in ultrafast pulsed laser systems that operate at low duty cycles, photons are only collected for a small fraction of the time during which a spectrum is being acquired. Increased laser powers are highly desirable for SRS because signal levels scale roughly as the product of the laser powers. Doubling the power of each laser results in a quadrupling of the SRS signals. The laser powers employed are only about 2 to 10 times greater than the laser powers commonly used for spontaneous Raman. In an exemplary implementation, the Pump laser 114 can have a 250-1000 mW output compared to the typical 20-100 mW Pump lasers used in spontaneous Raman without any rasterizing probe. A similar power range may be used for the Probe laser in the context of the systems and methods described herein. As no Probe lasers are used in spontaneous Raman instruments, no comparison of power can be made for the Probe laser, but it can be seen that the power level is much lower than the peak power levels encountered in ultrafast regimes.

The spectral resolution of the system is limited primarily by the quality of the lasers. The more stable and narrowband the optical output from the lasers, the higher the resolution. It is noted that there are no slits, lenses, or dispersive components in the light paths to limit the ultimate resolution of the system.

Figure 2:
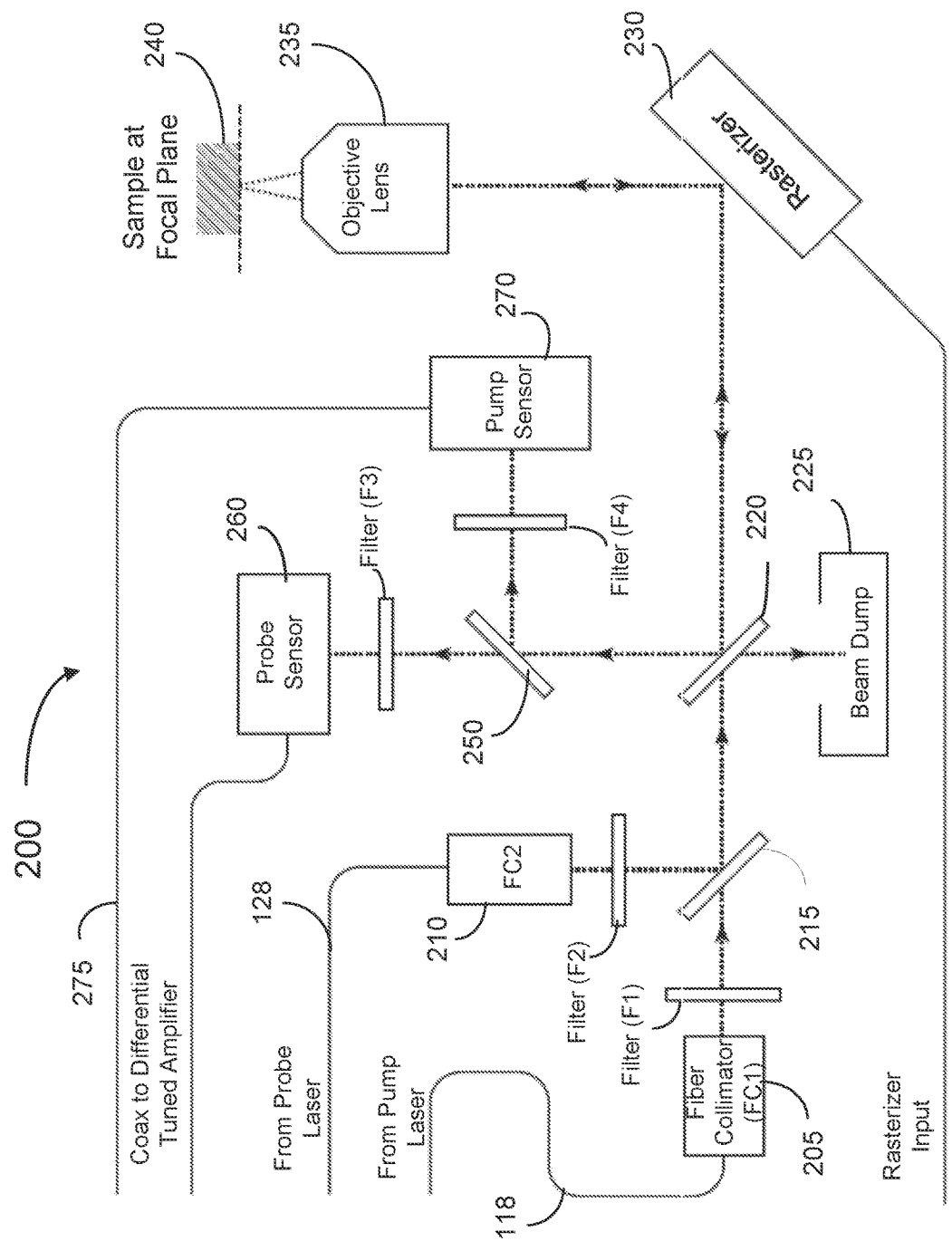
FIG. 2 is a schematic diagram of an R-probe according to an embodiment of the present disclosure.

One key to improving gain when using CW lasers is to moderately increase laser power, and hence peak power, at any single point on the sample, yet keep the average power relatively low. Typically, the SRS effect is obtained using ultrafast lasers operating at extremely high peak powers, even when the average power may be only 10 or so milliwatts. In embodiments of the systems and methods disclosed herein, CW lasers with power range from around 200 milliwatts to a few watts are employed. As noted, this power level is far lower than the high peak powers encountered with ultrafast lasers. Even at these reduced levels, the average power density that impinges upon a given sample (usually measured in W/cm$^2$) is minimized by use of the R-probe 200. A schematic diagram of an embodiment of an R-probe according to the present disclosure is shown in FIG. 2.

R-Probe

At the R-Probe 200, the optical fiber carrying the Pump laser 118 is fed to a first fiber collimator 205 and the optical fiber carrying the Probe Laser 128 is fed to a second fiber collimator 210. The fiber collimators 205, 210 are used to transform the light output from optical fibers 118, 128 into respective free-space collimated beams. The output from the first fiber collimator 205 (collimated Pump laser) is fed through a first filter (F1) which filters out long wavelengths. The output from the second fiber collimator (collimated Probe laser) is fed through a second filter (F2) which filters out short wavelengths. The outputs from F1 and F2 are both fed to a dichroic beam combiner 215. The output of the beam combiner 215 includes both the Pump and Probe lasers. The combined lasers output from the combiner are fed to a 50% silvered mirror 220. There are two outputs from the mirror 220. A first output is directed toward a beam dump 225. A second, output from the mirror 220 is directed to a rasterizer 230. The rasterizer 230 is a component that rapidly moves or scans the confocal beam which it receives from the mirror 220. The purpose of the rasterization is to reduce the average power of the lasers as they impinge upon a sample, such as live human tissue. A number of rasterization techniques can be employed to move the beam. For example, some implementations can employ mirrors attached and actuated by one or more voice coil actuators, piezo stacks, simple motors, or MEMS devices. The rasterizer outputs the moving beam, which includes combined Pump laser and the Probe laser photons, through an objective lens 235 onto a sample 240 at the focal plane of the lens.

Regarding the rasterization, the beam can be scanned across the sample 240 in a pattern (e.g., a circular or other shape), which can yield nearly a 70-fold decrease in average power density. With this magnitude of average power reduction, in the exemplary implementation, the lasers run at 25 times the power that would normally be used with a standard fixed-beam Raman probe. Increasing the laser power by a factor of 25 provides a significant benefit in the context of spontaneous Raman spectroscopy, where the signal is proportional to I (the laser flux or power) and the signal-to-noise is proportional to $\sqrt{I}$. In the case of spontaneous Raman, the signal strength is increased by a factor of 25, and the S/N by a factor of 5, whereas in the case of SRS, as a result of the nonlinear interactions between the lasers and sample, the benefit from the higher laser power is a gain of roughly 625 (25 times 25). Similarly, the S/N would be improved by a factor of 625/$\sqrt{25}$ which is 125. This is because with SRS the signal scales roughly with $I^2$ and the S/N with $I^2/\sqrt{I}$. The increase in laser power that can be achieved safely, without excessive sample heating. Thus, the R-Probe (and the higher laser power it permits) provides a heightened benefit in the case of SRS vis a vis standard spontaneous Raman, further increasing the sensitivity of the systems and methods described herein.

Returning to FIG. 2, Raman signals and other radiation output from the sample 240 travels backwards through the objective lens 235 to the rasterizer 230. The rasterizer reflects light coming from the objective lens 235 backwards to the 50-percent mirror 220. In the case of the returning beam, a first output from mirror 220 is directed toward dichroic beam-splitter 250. This beam includes the original Pump and Probe laser signals. A portion of the returning beam is transmitted back through the mirror toward the beam combiner 215, where they have no adverse effect. The signal reaching the dichroic beam splitter includes the Raman signals received from the sample 240. At the beam-splitter 250, the beam is split into first and second beams which travel in perpendicular directions. The first beam is fed to filter (F3) which passes long wavelengths and filters out short wavelengths. The second beam is fed to filter (F4) which, inversely, passes short wavelengths and filters out long wavelengths. The result is that the first beam, which includes long wavelengths, is fed to a first sensor 260 ("Probe" sensor) while the second beam, which includes short wavelengths is fed to a second sensor 270 ("Pump" sensor). Outputs of the Probe sensor 260 and Pump sensor 270 are fed via a coaxial cable to a differential amplifier (not shown in FIG. 2, reference number 300 in FIG. 1). The two-sensor arrangement makes possible differential measurements. Differential measurements are beneficial since the SRS effect involves both gain and loss. Any gain at the Probe wavelength is accompanied by a corresponding loss at the Pump wavelength, and vice-versa. Differential measurements can exploit this effect and thereby obtain improved performance over a single sensor system.

The R-probe shown in FIG. 2 should be considered as one embodiment, and variations on the implementation would be understood by those of skill in the art. As one example, it is possible to include only a single sensor. Another variation is to use fiber coupling for the sensors. Alternatively, both the sensors and lasers can be integrated into the R-Probe for free-space coupling. This implementation could minimize photon loss, but at the cost of reduced modularity. In the exemplary implementation shown in FIG. 2, the sensors are integrated in the R-probe while the laser apparatus, being large and complex assemblies that benefit from a modular design, are coupled to the R-probe by optical fibers.

There are other filter arrangements that might prove beneficial, and there are also designs that can be adapted for various modalities such as Offset Raman and Transmission Raman. For transmission Raman, the beam dump shown in FIG. 2 can be eliminated, significantly improving the throughput. In addition, the large area low noise sensors make Transmission Raman far more practical in terms of photon collection and acquisition speed than it would otherwise be. The beam dump can also be eliminated and replaced with multiple mirrors in another embodiment of the R-probe. In this embodiment, the mirrors can direct the beams that would otherwise have been removed by the beam dump to the objective lens at a slightly different angle than the primary beam so as to converge at a slightly offset spot on the sample. This technique avoids loss of photons to the beam dump while acquiring additional Raman-scattered photons from the sample, increasing the throughput and the effective sampling area. This embodiment can also eliminate problems with interference from light absorbing materials located in the beam dump that are Raman active.

The combination of the R-Probe and higher power CW lasers brings the sensitivity of the system closer to the sensitivity achieved using the more common picosecond and femtosecond pulse laser systems. Because the pulses of light hitting any single spot on the sample are far longer, and the peak powers far lower, than with ultrafast regimes, there is far less risk of tissue damage or other unwanted effects on the sample. The R-probe of the exemplary implementation is coupled to a tuned photodiode sensor device having high etendue as a result of large area detectors having large solid angles. These sensors, as well as two-port differential detection, also contribute to the CW-SRS sensitivity that can be achieved by the system and method described herein.

Tuned Photodiode Sensor

Equations (1) and (2) below describe the light intensity levels received at the sensors from SRS stimulation:

$$S_1 \approx a_1 I_1 + b_1 I_2 + c_1 I_1 I_2 \qquad (1)$$

and $$S_2 \approx a_2 I_1 + b_2 I_2 - c_2 I_1 I_2 \qquad (2)$$

In equations (1) and (2), $S_1$ and $S_2$ represent the total signal intensities at the Probe and Pump sensors, respectively, $I_1$ represents the intensity of the Pump laser, $I_2$ represents the intensity of the Probe laser, $a_1 I_1$ represents the signal received due to fluorescence (and some spontaneous Raman) induced by the Pump laser, $b_1 I_2$ represents the signal received due to Rayleigh scattering of Probe laser photons, $a_2 I_1$ represents the signal generated by Rayleigh scattering of Pump laser photons, $b_2 I_2$ represents the total spontaneous anti-stokes Raman signal (which is generally negligible), and $c_1 I_1 I_2$ and $c_2 I_1 I_2$ represent the stimulated Raman signals, both gain and loss, generated by the nonlinear SRS interaction. The coefficients $a_1$, $a_2$, $b_1$, $b_2$, $c_1$ and $c_2$ are constants associated with various kinds of scattering and fluorescence in the sample, with $c_1$ and $c_2$ being roughly proportional to stimulated Raman scattering. This stimulated Raman signal is generated when the difference in laser optical frequencies, $|\omega_1 - \omega_2|$, corresponds to a Raman active band of one or more of the substances in the sample. When the laser optical frequencies differ by an amount that does not correspond to any Raman active band, $c_1$ and $c_2$ are generally negligible since they reflect stimulated Raman scattering. It is noted that equations (1) and (2) are low power approximations applicable for the lasers used in the context of the systems and methods disclosed herein. At extremely high laser powers, there are typically additional exponential gains.

Those of skill in the art would appreciate that if $I_1$ and $I_2$ are modulated at radio frequencies $f_1$ and $f_2$, respectively, beat notes will be generated only by the product terms in equations (1) and (2), but not by the first two linear terms in each equation. The mathematics is virtually identical to that which describes a mixer or product detector in a communications receiver. The beat notes reflect only Raman signals generated by the nonlinear SRS interactions approximated by the product terms in equations (1) and (2) and they do not reflect the linear terms generated by Raleigh scattering and fluorescence.

From equations (1) and (2), it can be seen that stimulated Raman signals and beat notes scale with the product of the laser powers, but that shot noise increases with the square root of the weighted sum of those laser powers. Consequently, in shot-noise limited systems, S/N improves as the product of the laser powers divided by the square root of a weighted sum these powers. If the power of each laser is quadrupled, a 16-fold gain in the SRS signal results, and an 8-fold improvement in S/N. The beat notes mentioned above occur at $|f_1 - f_2|$ and $|f_1 + f_2|$ and are detected by the sensors. In addition to these informative beat notes, which may be fairly weak for weakly scattering analytes at low laser powers, the sensors also receive overwhelmingly strong unwanted signals at $f_1$ and $f_2$ (the laser RF modulation frequencies) as well as at DC. The Pump sensor receives the most overwhelming signal at $f_1$, as a result of Raleigh scattering of Pump laser photons; the Probe sensor receives the most overwhelming signal at $f_2$, as a result of Rayleigh scattering of Probe laser photons. The probe sensor also receives a fairly intense signal at mainly due to sample fluorescence induced by the Pump laser. The strong, but unwanted, signals at $f_1$ and $f_2$ can be well over 150 dB greater than the weak, but informative, beat notes at $|f_1 - f_2|$ and $|f_1 + f_2|$.

Consequently, if maximum sensitivity is to be attained without saturation of the sensors or front-end electronics, a sensor system with an exceptional blocking dynamic range (another term familiar to the radio design engineer) would be required. It is almost impossible to obtain a sufficient blocking dynamic range with the standard configuration consisting of a photodiode directly followed by a transconductance amplifier. However, this can be achieved with the tuned photodiode sensor system.

Figure 3:
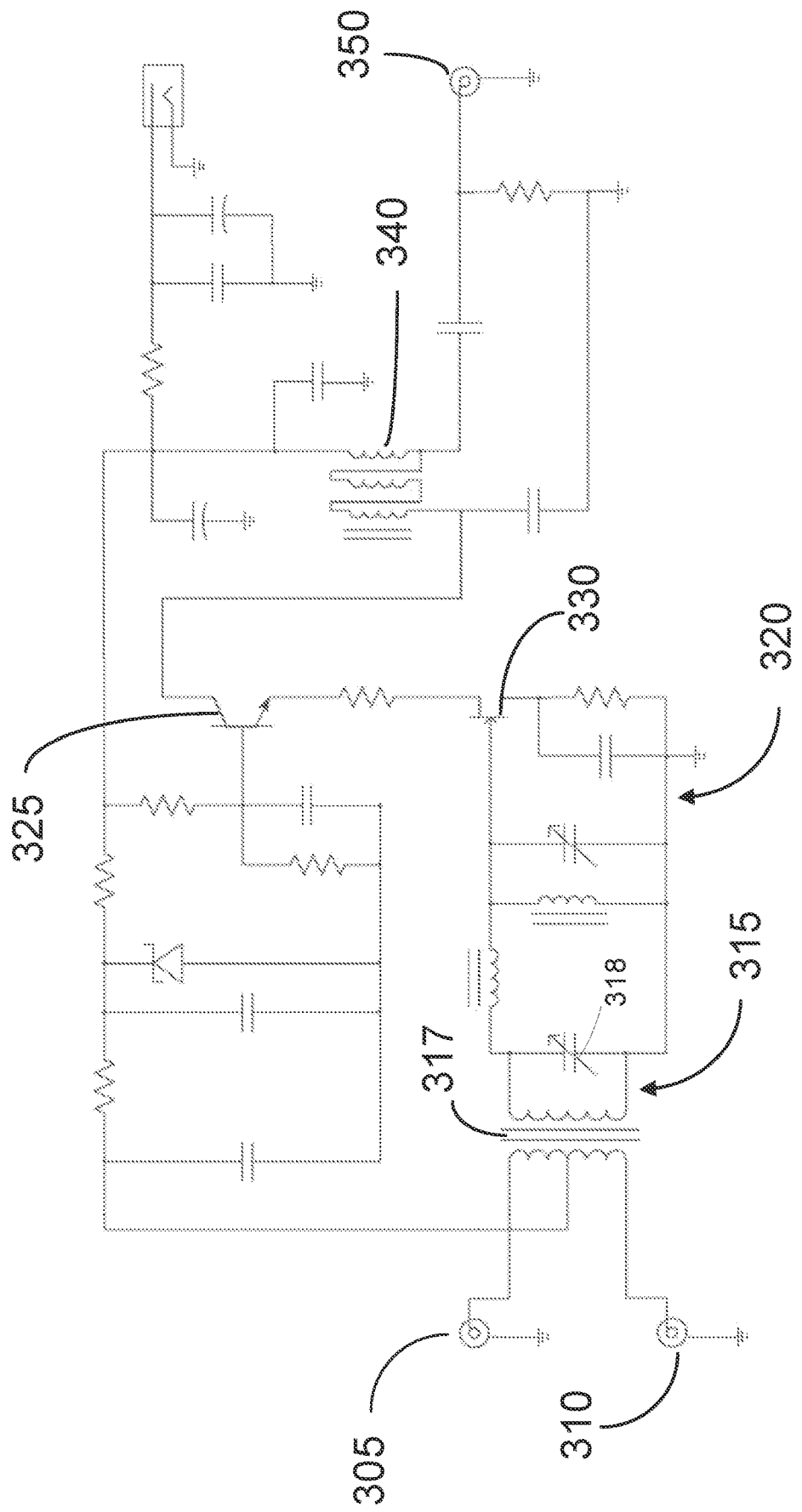
FIG. 3 is a circuit diagram of a tuned differential amplifier according to an embodiment of the present disclosure.

In the exemplary implementation, the Pump and Probe sensors comprise large area silicon photodiodes. One example is the Mounted Photodiode SM1PD1A (9 mm clear aperature, 375 pf @5 v reverse bias) provided by Thorlabs Inc. of Newton, NJ. These photodiodes normally work with 50Ω loads. A 50Ω load yields a rolloff frequency near 8 MHz given the high capacitance of the photodiodes. However, while this frequency response might be acceptable, a 50Ω load would reduce the voltage of the desired signal to an extremely low level. Great amplification would be needed and the desired signal would be close to the noise floor of the amplifier and load resistor. To resolve this difficulty, a differential photodiode amplifier as depicted in FIG. 3 is employed. The differential amplifier 300 is able to detect weak signals from a photodiode at a selected frequency, while avoiding interference and front-end overload from extremely strong signals at other frequencies.

The input signals from the Probe and Pump sensors 260, 270 (FIG. 2) are coupled to inputs 305, 310 of the differential amplifier 300. The amplifier 300 contain two critically coupled High-Q resonant circuits 315, 320 coupled to inputs 305, 310, a cascode amplifier consisting of two transistors 325, 330 in a middle section, and a moderate-Q resonant transformer 340 at the output. The tuned critically-coupled resonant circuits 315, 320 perform several important functions. First, the coupled high-Q tuned circuits 315, 320 act as short circuit inputs for DC, and as very low impedance inputs at both the laser modulation frequencies $f_1$ and $f_2$, providing a high level of photodiode linearity and dynamic range. As the critical-coupled high-Q tuned circuits 315, 320 completely block DC, and substantially attenuate the unwanted signals at $f_1$ and $f_2$, they protect the front-end cascode elements 325, 330 from overload and preserve the dynamic range for the desired weak signals. In addition, the high-Q tuned circuits 315, 320 can provide both for a differential input when a pair of photodiodes are used, as is the case in the exemplary implementation, as well as a single-ended input when only a single photodiode sensor is employed. The high capacitance of the large area photodiodes is also incorporated into the first High-Q resonant circuit 315. The first resonant circuit 315 employs a very tightly coupled toroidal transformer 317 that makes it possible for high levels of photodiode capacitance to be "tuned out" since such capacitance becomes part of the resonant tank circuit formed by C1 318 and the secondary of the transformer. The transformer reduces the impact of capacitive loading and obviates the need for a resistive load (e.g., a 50-a load) to achieve the desired frequency response. The tightly coupled tuned transformer 317 also supplies some noiseless gain. The transformer-derived voltage gain can be considered noiseless, since it does not involve any resistors (that produce Johnson noise) or active components (that produce shot noise, 1/f noise, and/or thermal noise). Together, these characteristics yield increased sensitivity to weak signals at the resonant frequency set at the informative beat note at $|f1-f2|$.

The cascode amplifier stage including transistors 325, 330 that follows the double tuned input network provides some additional gain as well as a high impedance input. The high input impedance found at the gate of a field effect transistor 330, the first transistor in the cascode, helps maintain the high Q and low loss of the resonant circuits and thus their selectivity. A tuned transformer 340 at the output of the tuned differential photodiode amplifier provides impedance matching to a standard 50-Ω load connected via coaxial cable 350. It also furnishes additional selectivity for the desired signals and further attenuation of the undesired ones. Attenuation of the signals at $f_1$ and $f_2$ (in the exemplary system, 4.8 MHz and 5.9 MHz, respectively) is greater than 110 dB. The output at resonance is about 0.8 volts with a 1 ma input signal (when properly loaded).

Signal Processing Stage

The output of the tuned photodiode amplifier 300 is fed to a software-defined dual channel radio component (SDR) 170 (shown in FIG. 1) that provides additional selectivity and amplification. The SDR 170 further attenuates the unwanted signals generated by fluorescence and Rayleigh scattering, and also allows the far weaker SRS Raman signals to be amplified and detected. The SDR 170 also digitizes these signals so that the host computer 155 can perform further signal processing in software, including sophisticated lock-in or matched filter detection. A coherent dual-channel SDR 170 such as that used by the author in the exemplary system can, with appropriate software, serve as an excellent lock-in detector. A 130 dB dynamic range can be obtained for the SDR 170 alone, acting as a simple lock-in detector with a 5 Hz bandwidth, without any selective front-end amplifier.

The SDR 170 comprises a high-speed analog-to-digital converter (ADC) and also incorporates down-conversion capabilities implemented using a field-programmable gate array (FPGA). An 80 MHz sampling rate followed by digital down-conversion was used in one implementation. Since the oscillators used in the laser modulators and in the sampling clock of the SDR are exceedingly stable, a lock-in style homodyne detector with a very slow phase-locked loop local oscillator, implemented in software on the host computer, provides very sensitive weak signal detection. In the exemplary system, a simple 5 Hz bandwidth filter, implemented using software, provides an accurate measurement of the beat note generated by the sample.

The SDR 170 and software allows a 5 uv signal at the SDR input to be easily seen in a spectral waterfall display when the bandwidth is set to 100 Hz (wide for a typical lock-in detector) and the programmable gain is set to its minimum value. A 5 uv signal occurs at the tuned differential photodiode amplifier's output with about 6 na of signal from the photodiodes at its inputs. At the lowest SDR gain setting, a 6 nanoampere RF signal at the beat note frequency of 1.1 MHz can be seen in the waterfall display.

The tuned photodiode amplifier 300 together with the SDR 170 solves many problems with a Raman spectrometer employing CW-SRS methods. The combination provides a very high blocking dynamic range (greater than 200 dB) at the laser modulation frequencies and a high signal dynamic range (greater than 120 dB) at the beat notes. Due to these dynamic ranges, intense signals at the laser modulation frequencies do not interfere with sensitive detection of weak beat notes generated by the stimulated Raman process.

The exemplary implementation described above exploits lasers and sensors operating in the visible part of the spectrum. Coherent light sources and detectors that operate in other parts of the spectrum, for example, the near infrared (NIR) region from 900 to 1700 nm, could also be used. Tuned laser systems are available for this spectral region. For example, large area Indium Galium Arsinide (InGaAs) photodiodes are readily available that can be used as replacements for large area Silicon (Si) photodiodes that are used as sensors in the exemplary system. It should be noted that standard (spontaneous) Raman spectrometry is often carried out with NIR excitation as a means of reducing fluorescence. A disadvantage using NIR is that, due to the $1/\lambda^4$ dependence of Raman scattering on excitation wavelength, the Raman signals are weaker than what is typically obtained at shorter visible wavelengths. However, in the context of the method and system described herein, the large SRS gain can overcome the problem of weaker Raman signals allowing sensitive NIR Raman spectrometry to be performed.

In the exemplary implementation described above, tuned photodiodes are employed as the sensors. However, it is also possible to use other kinds of sensors with appropriate adjustments, such as, but not limited to photomultiplier tubes (PMTs), fast CCD "streak" cameras, avalanche photodiodes, and bolometers. The considerations with the sensors are ensuring sufficient blocking dynamic range and having the ability to reduce or avoid 1/f laser intensity noise. The 1/f noise can be handled by operating the sensor at frequencies greater than 1 MHz, as was done in the context of the exemplary system described herein. For sensors that do not operate well at such high frequencies, 1/f noise can also be reduced at the lasers, for example, by the use of negative feedback of laser intensity. If the 1/f intensity noise is sufficiently reduced at the lasers, a very low frequency beat note, e.g., 0.5 Hz, could be used, rather than the 1.1 MHz beat note described in the exemplary system. Reduction of the beat note frequency would allow even bolometers and other slow sensors to operate effectively. With sufficiently reduced 1/f intensity noise in the light sources, the system could alternatively be implemented with a broadband "Probe" source, such as a high-power LED, a fixed wavelength "Pump" laser, and a fast, low readout noise CCD imager in a dispersive spectrometer arrangement. A low frequency beat note of, say, 0.5 Hz can be detected with such a CCD imager simply by obtaining a sequence of, for example, 0.2 second integrations. Lock-in detection can be performed on the images, after-the-fact, by software in the host computer. This would result in a low-fluorescence and clean Raman spectrum. Improving dynamic range with the alternative sensor embodiments would likely be more challenging, but there are some techniques that can be employed to achieve this; in one exemplary technique, multiple large area photomultiplier tubes together with a diffuser can be used.

In an alternative embodiment, the R-probe can be removed from the system. Instead, a more complex laser modulation scheme together with a beam-spreading or "fat beam" probe is employed. With higher peak power lasers, rounded pulses measured in milliseconds, and RF modulations such as those already discussed, the energy is spread over a larger area of the sample by the beam spreader or as a result of the probe design (non-rasterizing). Given the large capture areas of the sensors, the photons returning from a larger area on the sample are efficiently captured.

In addition, instead of using a single laser with a large tuning range it is possible to use several lasers with smaller tuning ranges to cover the relevant regions of the Raman spectrum. In a more drastic simplification of the device, several fixed (not tuned) lasers may be employed. This embodiment can work well for many specific applications once the optimal wavelengths are determined. The laser beams can be combined with custom interference filters (which can be miniaturized), or with a fiber combiner in which small multimode fibers are butted with optical cement to a large multimode fiber. This embodiment can enable small, high-performance devices to be constructed.

Furthermore, the systems described herein can be miniaturized since there is no need for dispersive elements or long optical paths. Chip-based implementations or other miniature devices are feasible for specific applications because photosensors and lasers can be fabricated as arrays at the chip level and optical components such as interference filters and microlenses can be fabricated at this scale as well. To obtain the effect of the R-Probe on a chip, one can pulse an array of miniature lasers in a scanning pattern, with each miniature laser emitting a relatively high-power pulse. As with other embodiments and implementations, the pulses in this case are on the order of millisecond or microseconds and would employ only moderately higher powers than used for spontaneous Raman.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the disclosure as understood by a person having ordinary skill in the art.

What is claimed is:

1. A system for high gain stimulated Raman spectroscopy comprising:
   a first continuous wave laser having a first output beam at a tunable optical frequency which is modulated at a first RF modulation frequency ($f_1$) and a first average power of laser radiation;
   a second continuous wave laser having a second output beam at an optical frequency which is modulated at a second RF modulation frequency ($f_2$) and a second average power of laser radiation, wherein the first and second RF modulation frequencies ($f_1$, $f_2$) are selected such that their difference or sum beat notes ($f_1-f_2$; $f_1+f_2$) represent a Raman resonance frequency;
   a dual-beam rasterizing probe (R-probe) including first and second photosensors and coupled to the first and second continuous wave laser output beams, the R-probe including a rasterizer that is configured to scan the first and second continuous wave laser output beams onto a sample over an exposure area, wherein the scanned sample exposure area is exposed to an average power of laser radiation that is reduced relative to first and second average powers of laser radiation and in response thereto is stimulated by the laser beams to emit Raman radiation signals, the R-probe further directing Raman signals emitted from the sample to the first and second photosensors, the first and second photosensors having respective first and second outputs responsive to the first and second continuous wave laser output beams and the Raman signals emitted from the sample; and
   a differential amplifier coupled to outputs of the first and second photosensors of the R-probe that is configured to provide sensitivity and gain to signals at the beat note resonant frequency ($f_1-f_2$) and to filter out signals at other frequencies so as to output the Raman radiation signals with gain.

2. The system of claim 1, further comprising a software-defined dual-channel radio component coupled to an output of the differential amplifier that is configured to attenuate fluorescence and Rayleigh scattering signals and to amplify SRS Raman signals.

3. The system of claim 2, further comprising a host computing device coupled to the first and second continuous wave lasers and to the software-defined dual-channel radio component, the host computing device having a processor configured to:
   control the optical frequency of the first continuous wave laser;
   receive signals output from the software-defined dual-channel radio component; and
   process the signals received from the software-defined dual-channel radio using at least one of lock-in detection and matched filter detection.

4. The system of claim 1, wherein the first continuous wave laser has a first wavelength and the second continuous wave laser has a second wavelength, and the first wavelength is shorter than the second wavelength.

5. The system of claim 1, wherein the first and second continuous wave lasers are modulated using an RF modulation frequency in a range of 50 KHz to 20 MHz.

6. The system of claim 1, wherein the first and second continuous wave lasers have an average power in a range of 250 to 1000 mW.

7. The system of claim 1, wherein the R-probe includes a partially transmissive mirror coupled between the first and second continuous wave lasers and the rasterizer, wherein the first and second output beams are partially transmitted to the rasterizer, and first and second reflected beams which are reflected from the first and second output beams scanning the sample are partially reflected toward the first and second photosensors.

8. The system of claim 7, wherein the R-probe further includes a dichroic beam-splitter positioned between the 50-percent mirror and the first and second photosensors, a long-pass (wavelength) optical filter positioned between the dichroic beam-splitter and the first photosensor, and a short-pass (wavelength) optical filter positioned between the dichroic beam-splitter and the second photosensor.

9. The system of claim 1, wherein the rasterizer includes one or more mirrors that are actuated by at least one of a voice coil actuator, a piezo stack, a motor, and a MEMS device.

10. The system of claim 1, wherein the differential amplifier includes two coupled high-Q resonant circuits that provide low impedance inputs at the beat notes, completely block DC, and attenuate the unwanted signals at the modulation frequencies $f_1$ and $f_2$.

11. The system of claim 10, wherein the differential amplifier further includes a cascode amplifier coupled to an output of the coupled high-Q resonant circuits that provides additional gain while preserving a high Q and low loss of the resonant circuits.

12. A method of obtaining high gain stimulated Raman spectroscopy comprising:
providing a first continuous wave laser having first output beam at a tunable optical frequency which is modulated at a first RF modulation frequency ($f_1$) and a first average power of laser radiation;
providing a second continuous wave laser having a second output beam at an optical frequency which is modulated at a second RF modulation frequency ($f_2$) and a second average power of laser radiation, wherein the first and second RF modulation frequencies ($f_1$, $f_2$) are selected such that their difference or sum beat notes ($f_1-f_2$; $f_1+f_2$) represent a Raman resonance frequency;
rasterizing the first and second output beams continuous wave lasers by scanning the first and second output beams onto a sample over an exposure area, wherein the scanned sample exposure area is exposed to an average power of laser radiation that is reduced relative to first and second average powers of laser radiation and in response thereto is stimulated by the laser beams to emit Raman radiation signals;
receiving the Raman signals at first and second photosensors; and
delivering output of the first and second photosensors to a differential amplifier that is configured to provide sensitivity and gain to signals at the beat note resonant frequency ($f_1-f_2$) and to filter out signals at other frequencies so as to output the Raman radiation signals with gain.

13. The method of claim 12, further comprising attenuating fluorescence and Rayleigh scattering signals and amplifying SRS Raman signals output from the differential amplifier.

14. The method of claim 12, further comprising using a processor to:
control the optical frequency of the first continuous wave laser;
receive signals output from the software-defined dual-channel radio component; and
process the signals received from the software-defined dual-channel radio using at least one of lock-in detection and matched filter detection.

15. The method of claim 12, wherein the first continuous wave laser has a first wavelength and the second continuous wave laser has a second wavelength, and the first wavelength is shorter than the second wavelength.

16. The method of claim 12, wherein the first and second continuous wave lasers are modulated using an RF modulation frequency in a range of 50 KHz to 20 MHz.

17. The method of claim 12, wherein the first and second continuous wave lasers have a power in a range of 250 to 1000 mW.

18. The method of claim 12, further comprising:
directing radiation emitted by the sample through a beam splitter which splits the radiation into a first beam and a second beam;
filtering the first beam through a long pass (wavelength) filter and passing the filtered first beam to the first photosensor; and
filtering the second beam through a short pass (wavelength) filter and passing the filtered second beam to the second photosensor.

19. The method of claim 12, wherein the differential amplifier includes two coupled high-Q resonant circuits provide low impedance inputs at beat notes, completely block DC, and substantially attenuate the unwanted signals at the modulation frequencies $f_1$ and $f_2$.

20. The method of claim 19, wherein the differential amplifier further includes a cascode amplifier coupled to an output of the coupled high-Q resonant circuits that provides additional gain while preserving a high Q and low loss of the resonant circuits.

21. A system for high gain stimulated Raman spectroscopy comprising:
a first continuous wave laser having a first output beam at a tunable optical frequency which is modulated at a first RF modulation frequency ($f_1$) and a first average power of laser radiation;
a second continuous wave laser having a second output beam at an optical frequency which is modulated at a second RF modulation frequency ($f_2$) and a second average power of laser radiation which is modified by pulsing the output beam, wherein the first and second RF modulation frequencies ($f_1$, $f_2$) are selected such that their difference or sum beat notes ($f_1-f_2$; $f_1+f_2$) represent a Raman resonance frequency;
a beam spreader that expands the first and second output beams into first and second expanded beams having reduced average power per unit area in comparison to the first and second output beams;
first and second photosensors optically coupled to the first and second continuous wave lasers and the beam spreader;
wherein the first and second expanded beams are directed onto a sample over an exposure area, and in response thereto is stimulated by the laser beams to emit Raman radiation signals which are directed to the first and second photosensors, the first and second photosensors having respective first and second outputs responsive to the first and second expanded beams and the Raman signals emitted from the sample; and
a differential amplifier coupled to outputs of the first and second photosensors of the R-probe that is configured to provide sensitivity and gain to signals at the beat note resonant frequency ($f_1-f_2$) and to filter out signals at other frequencies so as to output the Raman radiation signals with gain.

* * * * *